United States Patent [19]

Knobloch

[11] 3,873,506

[45] Mar. 25, 1975

[54] POLYTETRAHALOBENZENE DICARBOXYLIC ANHYDRIDES

[75] Inventor: James O. Knobloch, Naperville, Ill.

[73] Assignee: Standard Oil Company, Chicago, Ill.

[22] Filed: Jan. 21, 1974

[21] Appl. No.: 434,953

[52] U.S. Cl.......... 260/78.4 R, 260/897 C, 260/899
[51] Int. Cl. .............................................. C08f 5/00
[58] Field of Search .............................. 260/78.4 R Primary Examiner—Joseph L. Schofer
Assistant Examiner—Maria S. Tungol
Attorney, Agent, or Firm—William H. Magidson; Arthur G. Gilkes; William T. McClain

[57] ABSTRACT

Polytetrahalobenzene dicarboxylic anhydrides suitable for use as fire retardants.

5 Claims, No Drawings

POLYTETRAHALOBENZENE DICARBOXYLIC ANHYDRIDES

This invention relates to polytetrahalobenzene dicarboxylic anhydrides. More particularly, this invention relates to polytetrahaloterephthalic anhydrides.

Recently, there has been considerable interest in the production of fire retardant polymeric products. For example, fire retardancy has been built into condensation polymer molecules by chemically incorporating a monomer having a high concentration of halogen into the polymer. Usually, various fillers and low molecular weight halogenated materials (molecular weights under 1,000) have been employed as additives in the various addition polymers, since it is more difficult to get the desired degree of fire retardancy by chemically incorporating halogenated monomers into the addition polymers. The present techniques of adding low molecular weight halogenated materials to impart fire retardancy to addition polymers often results in loss of the halogenated materials during processing, e.g., extrusion or molding, and exudation during use of the fabricated polymer.

The general object of this invention is to provide a new class of relatively high molecular weight halogenated materials suitable for imparting fire retardancy to polymeric materials. Another object of this invention is to provide a new class of relatively high molecular weight polymers suitable for imparting permanent fire retardancy to addition polymers. Other objects appear hereinafter.

In one aspect, this invention is a new class of polytetrahalobenzene dicarboxylic anhydrides.

In the second aspect, this invention is directed to fire retardant compositions comprising a minor proportion of a polytetrahalobenzene dicarboxylic anhydride and a major proportion of a flammable polymeric material.

In a third aspect, this invention is a process of producing polytetrahalobenzene dicarboxylic acid anhydrides wherein a polytetrahalobenzene dicarboxylic acid is condensed in liquid sulfur dioxide.

For the purpose of this invention, the terms "polytetrahalobenzene dicarboxylic anhydride", "polytetrahaloisophthalic anhydride" and "polytetrahaloterephthalic anhydride" refer to homopolymeric or copolymeric polyanhydrides containing linear anhydride groups. The nature of the polymer end groups is unimportant but are usually

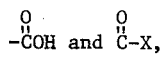

wherein X is halogen.

The objects of this invention can be attained with a new class of resinous (solid) polytetrahalobenzene dicarboxylic anhydrides wherein the carboxylic groups are meta or para to each other, particular polytetrachloroterephthalic anhydride and polytetrabromoterephthalic anhydride. Surprisingly, the tetrahaloterephthalic acids, which are too sterically hindered to undergo most carboxylic acid reactions, can be converted easily to polyanhydrides. The anhydride linkages of the polytetrahaloterephthalic anhydrides are stable even when the polymers are refluxed in aqueous alkali. The halo groups are particularly stable since there are no hydrogen atoms on the aromatic ring. Typically, the tetrahaloterephthalic anhydride polymers have a molecular weight over 3,000 (about 8 mer units) while the preferred polymers have molecular weights of about 8,000 (approximately 30 mer units) to 30,000 or more. Accordingly, addition polymers containing these anhydrides can be processed without volatilization of the polyanhydride and loss of fire retardancy.

Briefly, the polyanhydrides are preferably produced by heating the appropriate meta or para acid with a dehydrating agent under pressure in liquid sulfur dioxide. The ortho acids cannot be used since they only cyclize.

Suitable tetrahalobenzene dicarboxylic acids useful in producing the polyanhydrides of this invention include tetrachloroterephthalic acid, tetrabromoterephthalic acid, chlorotribromoterephthalic acid, 2,5-dibromo-3,6-dichloroterephthalic acid, trichlorobromoterephthalic acid, trichlorofluoroterephthalic, trifluorobromoterephthalic acid, tetrachloroisophthalic acid, tetrabromoisophthalic acid, etc.

Polyanhydrides composed of only tetrahalobenzene dicarboxylic acids are relatively infusible and solvent insoluble. The tetrahalobenzene dicarboxylic acids can be polymerized with other dicarboxylic acids to improve their plasticity or other physical properties. In general, the tetrahalobenzene dicarboxylic acids should comprise at least 50 mole percent of the polyanhydride in order to maintain the stability of the anhydride linkage during subsequent processing of the polyanhydride. Suitable comonomers include aromatic dicarboxylic acids, such as terephthalic acid, isophthalic acid, 2,5-dibromoterephthalic acid, phthalic acid, 2,6-naphthalene-dicarboxylic acid, etc.; aliphatic dicarboxylic acids such as adipic acid, glutaric acid, sebacic acid, hexafluoroglutaric acid, octafluoroadipic acid, etc.

The tetrahalobenzene dicarboxylic acids can be converted to polyanhydrides by heating the acid, dissolved in liquid sulfur dioxide, together with a dehydrating agent, preferably sulfur trioxide, under pressure. The weight ratio of tetrahalobenzene dicarboxylic acid to sulfur dioxide can range from about 1 to 25 parts by weight, and preferably 3 to 20 parts by weight, per 100 parts by weight sulfur dioxide. The sulfur trioxide should be present in a ratio of 0.5 to 10 moles per mole acid, preferably 1 to 3. However, the yield of polyanhydride tends to drop as the mole ratio of dehydrating agent to acid goes above 1:1. For example, there is 69 percent yield at a 1:1 ratio of sulfur trioxide to tetrabromoterephthalic acid, a 59 percent yield at 2:1 and 23 percent yield at 4:1.

The concentration of sulfur trioxide catalyst to acid can be easily adjusted by dispersing the tetrahaloterephthalic acid in at least two moles sulfur trioxide per mole tetrahaloterephthalic acid. The excess sulfur trioxide is removed by dispersing the sulfur trioxide-tetrahaloterephthalic acid in a perfluorohydrocarbon, such as Freon 113 (1,1,2-trichlorotrifluroethane), and partitioning insoluble reaction product. This reaction product and approximately 0.5 to 2.0 moles of dicarboxylic acid are dispersed in liquid sulfur dioxide to provide approximately 0.66 to 1.33 moles sulfur trioxide per mole of dicarboxylic acids. While this method is convenient for producing copolymeric polyanhydrides in good yields, the polymers are generally of somewhat lower molecular weight and contain about 8 to 15 anhydrides moieties.

The reaction can be carried out at −10° to 150°C., preferably 100° to 135°C. under sufficient pressure to dissolve the acid in the sulfur dioxide. Under these conditions, the reaction is relatively rapid and polymerization can be completed in ¼ to 2 hours.

The polyanhydrides, which have

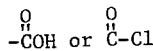

end groups, can be isolated by distilling off sulfur dioxide, partitioning off insoluble polyanhydride and washing out impurities by conventional means, e.g., by dissolving sulfur reaction product and unreacted acid in water and methanol and partitioning the insoluble polyanhydride.

The polyanhydrides can also be produced by less efficient means. Homopolymeric tetrachloroterephthalic anhydride and homopolymeric tetrabromoterephthalic anhydride can be produced either during the production of the acid (halogenation of terephthalic acid) or in the separation of the tetrahaloterephthalic acid from its impurities. Present evidence indicates that formation of the polyanhydride is dependent on the process of isolation. For example, tetrachloroterephthaloyl chloride can be produced by chlorinating terephthalic acid or terephthaloyl chloride in chlorosulfonic acid with chlorine. If the tetrachloroterephthaloyl chloride is recovered from the chlorosulfonic acid by extraction or crystallization, there is only a little polyanhydride formed. On the other hand, if the chlorosulfonic acid is distilled from the tetrachloroterephthaloyl chloride, polytetrachloroterephthalic anhydride is formed in much higher yields and can be recovered by suspending the residue in methanol and partitioning. The methanol dissolves the monomeric tetrachloroterephthaloyl chloride and residual chlorosulfonic acid. The insoluble residue from the methanol partitioning is polytetrachloroterephthalic anhydride of a lower molecular weight than that produced by the preferred route. Yields of about 35 to 50 percent based on the moles of starting terephthalic acid are obtained.

In other cases, homopolymeric tetrahaloterephthalic anhydride has been produced by reacting terephthalic acid with halogen (e.g., bromine) in oleum using iodine catalyst, recovering the insolubles by partitioning, refluxing the insolubles in methanol to dissolve the free acid and partitioning insoluble polytetrahaloterephthalic anhydride to obtain yields of about 15 to 30% based on the moles of starting terephthalic acid.

The polytetrahalobenzene dicarboxylic anhydride polymers, produced by any route, can be blended with a suitable flammable polymer, preferably a thermoplastic addition polymer, to impart the desired degree of fire retardancy. Suitable thermoplastic addition polymers include homopolymers, copolymers, block copolymers, etc., of olefins, such as ethylene, propylene, styrene, vinyl toluene; methyl methacrylate; ethyl acrylate, vinyl chloride; vinyl bromide; acrylonitrile; butadiene; etc. As indicated above, the polyhalobenzene dicarboxylic anhydride should comprise a minor amount of the composition (less than 50 percent by weight down to about 0.5 percent by weight). The concentration of polyanhydride should be adjusted to provide the desired degree of fire retardancy. For example, compositions comprising 85 percent by weight of either polystyrene or polypropylene and 15 percent by weight tetrabromoterephthalic anhydride have an SE-0 or SE-1 rating. These compositions contain about 10.3% by weight bromine.

The examples following are merely illustrative and should not be construed as limiting the scope of the invention.

EXAMPLE I

Nine and forty-five hundredth grams of tetrachloroterephthalic acid was added to an open, dry 300 ml Hastelloy C autoclave together with 1.29 ml of sulfur trioxide (about 2.49 grams) and the autoclave was closed. One hundred thirty-six grams of liquid sulfur dioxide was pressured into the autoclave after it had been pressure tested with nitrogen and vented. The autoclave temperature was raised to 120°C. (575 psig) over the period of one hour while stirring at 2100 r.p.m. and then held at a range of 123° to 129°C. (614–675 psig) for 90 minutes. The next day, the autoclave was opened and about 95 ml of a gray, smooth suspension was poured out. The sulfur dioxide was permitted to evaporate and the residue was dispersed in 400 ml of water and digested for three hours on a steam bath. After cooling, the insoluble polymer was filtered, washed with three 45 ml portions of water and dried. The dry polymer weighed 7.10 grams. A 4.95 gram sample of the crude polytetrachloroterephthalic acid anhydride, was refluxed in 80 ml methanol for four hours, cooled, filtered and washed with 50 methanol. Dry polymer weighing 1.88 grams was isolated. The infrared spectrum showed absorptions at 1820, 1763, 1170 and 1000 cm$^{-1}$. The acid number of the polyanhydride was 13 mg. of KOH per gram, indicating an average molecular weight of 8,640 and a polymer chain of 30.1 tetrachloroterephthalic acid anhydride moieties. The product analyzed 49.1 percent chlorine.

EXAMPLE 2

Three and one half grams of tetrabromoterephthalic acid was placed in an autoclave with 25 ml of sulfur trioxide and stirred for five minutes. Excess sulfur trioxide was removed with one 110 ml and four 50 ml portions of Freon 113. Then, 4.4 grams of tetrachloroterephthalic acid and 139 grams of sulfur dioxide was added to the autoclave. The reaction was carried out with stirring (2,000 to 2,200 r.p.m.) in an autoclave at 124°C. (622 to 649 psig) for 70 minutes. The next day, the reactor was chilled and opened under nitrogen. A gray-tan suspension of polymer was poured out and after the sulfur dioxide was evaporated, the residue was digested with 280 ml of water on the steam bath for 75 minutes. The cooled suspension was filtered, washed with two 30 ml portions of water and dried, yielding a cake weighing 6.0 grams. All of the product was refluxed with 100 ml of absolute methanol for 3½ hours, cooled to room temperature, filtered and washed with two 25 ml portions of methanol. The dried cake weighed 3.4 grams. The heteropolymer had an infrared spectrum which indicated a mixed anhydride showing absorption at 1820, 1785 and 1763, 1170, 1145, and 990 cm$^{-1}$. The polymer contained 31.9 percent by weight bromine and 26.0 percent chlorine which is equivalent to 46.3 weight percent tetrabromoterephthalic acid anhydride and 52.4 percent tetrachloroterephthalic acid anhydride, i.e., a mole ratio of tetrabromoterephthalic acid moieties to tetrachloroterephthalic moieties of 1 to 1.83 compared to a feed ratio of 1 to 2. The acid number of the polymer was 32 mg of KOH per gram which was indicative of a molecular weight of about 3,500, and an average polymer chain containing 3.5 tetrabromoterephthalic acid moieties and 6.5 tetrachloroterephthalic acid moieties.

EXAMPLE 3

Two and two-tenths grams of tetrachloroterephthalic acid was mixed with 25 ml sulfur trioxide in an open 300 ml autoclave and stirred five minutes under nitrogen. Excess sulfur trioxide was removed with one 100 and four 50 ml portions of Freon 113. Three and forty-nine hundredths grams of tetrabromoterephthalic acid was added to the autoclave together with 137 grams of liquid sulfur dioxide, heated at 123°C. under nitrogen in the sealed autoclave for 1½ hours and cooled to room temperature. The product was isolated by evaporating the sulfur dioxide at room temperature, digesting the residue for two hours in 300 ml of water on a steam bath, filtering the suspension and washing the suspension in two 50 ml portions of water. The dried cake weighed 3.53 grams. A 3.45 gram sample was refluxed 2½ hours in 57 ml of absolute methanol, cooled to room temperature, filtered and dried, yielding 3.34 grams of polymer having an infrared spectrum absorbing at 1820, 1785, 1763, 1173, 1138 and 990 cm$^{-1}$. The polymer contained 45.5 percent bromine and 14.7 percent chlorine which is equivalent to 66 weight percent tetrabromoterephthalic acid anhydride moieties and 29.6 weight percent tetrachloroterephthalic acid anhydride moieties. The mole ratio of tetrabromoterephthalic moieties to tetrachloroterephthalic acid moieties was 1.37 to 1 compared to a 1 to 1 feed ratio of acids. The acid number of the polymer was 24 mg of KOH per gram indicating an average polymer chain containing 6.93 tetrabromo and 5.06 tetrachloro moieties and a molecular weight of 4,677.

EXAMPLE 4

This example illustrates the preparation of a polyanhydride having tetrabromoterephthalic moieties and terephthalic moieties. Two and one-half grams of tetrabromoterephthalic acid was mixed with 25 ml sulfur trioxide in an open 300 ml autoclave and stirred five minutes under nitrogen. Excess sulfur trioxide was removed with one 100 and four 50 ml portions of Freon 113. Two grams tetrabromoterephthalic acid and 0.18 grams terephthalic acid were added to the autoclave together with 135 grams of sulfur dioxide, heated at 125°C. under nitrogen in the sealed autoclave at 610 psig for 80 minutes while stirring at 2000 r.p.m. and cooled to room temperature. After the sulfur dioxide evaporated, the product was stirred in 300 ml water and dried yielding 3.153 grams crude polymer. A 1.048 gram sample of the crude polymer was suspended in 14 ml of dimethyl formamide and stirred for two hours at 25°C. to extract unreacted terephthalic acid. The sample was filtered, suspended in 20 ml absolute methanol and stirred for two hours to extract unreacted tetrabromoterephthalic acid. The suspension was filtered, resuspended twice in 30 ml portions methanol and vacuum dried at 50°C. yielding 0.878 grams of copolymer. The acid number of the polymer was 23 mg of KOH per gram and the polymer analyzed 66.0 percent bromine indicating a molecular weight of 4,881. The average anhydride polymer chain contained 10 tetrabromoterephthalic acid moieties and 1.4 terephthalic acid moieties.

EXAMPLE 5

This example illustrates the preparation of homopolymeric tetrachloroisophthalic anhydride. Example 1 was repeated using 9.42 grams tetrachloroisophthalic acid in place of the tetrachloroterephthalic acid, the sulfur dioxide content was reduced to 133 grams, the residue was digested for 1¾ hours in 800 ml water, cooled, filtered and washed with two 25 ml portions of water. The dry weight of the polymer was 0.52 grams. The infrared spectrum showed absorptions at 1825, 1764, 1556, 1381, 1261, 1158, 1066, 909, 882 and 786 cm$^{-1}$. The polyanhydride did not melt up to 315°C. when heating was discontinued.

EXAMPLE 6

This example illustrates the preparation of a tetrabromoterephthalic anhydride-hexafluoroglutaric anhydride copolymer. Four and seven-tenths grams of tetrabromoterephthalic acid was mixed with 25 ml sulfur trioxide in an open 300 ml autoclave. Excess sulfur trioxide was removed by washing with one 100 ml and three 50 ml portions of Freon 113. Two and thirty-three hundredths grams hexafluoroglutaric acid and 137 grams sulfur dioxide were added to the autoclave, heated at 126°–127°C. under nitrogen in the sealed autoclave at 615–625 psig for 2 hours and cooled to room temperature. After the sulfur dioxide evaporated, the residue was stirred in 300 ml water and filtered yielding 4.29 grams polyanhydride. A 4.16 gram sample was stirred at room temperature in 65 ml absolute methanol for two hours to extract unreacted acids, filtered, washed with more methanol and dried at 50°C. in a vacuum oven yielding 1.795 grams of polymer having infrared spectrum absorption at 1817, 1782, 1334, 1315, 1178, 1138, 1043 and 978 cm$^{-1}$. The polyanhydride, which had 66.6 percent bromine, an acid number of 36 mg KOH per gram and 3120 molecular weight, contained 93.3 mole percent tetrabromoterephthalic acid moieties and 6.7 mole percent hexafluoroglutaric acid moieties.

I claim:

1. A resinous polytetrahalobenzene dicarboxylic anhydride, wherein the carboxylic groups are meta or para to each other.

2. The resinous anhydride of claim 1 wherein said polytetrahalobenzene dicarboxylic anhydride comprises polytetrahaloterephthalic anhydride moieties.

3. The resinous anhydride of claim 1 wherein said resinous anhydride is a homopolymer.

4. The resinous anhydride of claim 1 wherein said resinous anhydride comprises tetrachloroterephthalic anhydride moieties.

5. The resinous anhydride of claim 1 wherein said resinous anhydride comprises tetrabromoterephthalic anhydride moieties.

* * * * *